United States Patent
Liu

(10) Patent No.: US 7,103,371 B1
(45) Date of Patent: Sep. 5, 2006

(54) METHOD AND APPARATUS FOR DYNAMIC VOICE RESERVATION WITHIN WIRELESS NETWORKS

(75) Inventor: Yu-Jih Liu, Ledgewood, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 294 days.

(21) Appl. No.: 10/689,661

(22) Filed: Oct. 22, 2003

(51) Int. Cl.
*H04Q 7/20* (2006.01)

(52) U.S. Cl. ............... 455/456.4; 455/511; 370/348

(58) Field of Classification Search ......... 455/410, 455/411, 412.2, 414.4, 462, 456.4, 511, 412.1, 455/518; 370/348, 337, 442
See application file for complete search history.

(56) References Cited

U.S. PATENT DOCUMENTS

| | | | |
|---|---|---|---|
| 5,502,722 A | 3/1996 | Fulghum | |
| 5,633,874 A | 5/1997 | Diachina et al. | |
| 5,640,395 A | 6/1997 | Hamalainen et al. | |
| 5,680,508 A | 10/1997 | Liu | |
| 5,701,298 A | 12/1997 | Diachina et al. | |
| 5,790,551 A | 8/1998 | Chan | |
| 6,052,594 A | 4/2000 | Chuang et al. | |
| 6,115,390 A | 9/2000 | Chuah | |
| 6,256,301 B1 | 7/2001 | Tiedemann, Jr. et al. | |
| 6,331,973 B1 | 12/2001 | Young et al. | |
| 6,404,756 B1 | 6/2002 | Whitehill et al. | |
| 6,445,921 B1* | 9/2002 | Bell | 455/426.1 |
| 6,507,587 B1 | 1/2003 | Bahl | |
| 6,577,618 B1 | 6/2003 | Diachina et al. | |
| 6,735,188 B1* | 5/2004 | Becker et al. | 370/342 |
| 2002/0080750 A1 | 6/2002 | Belcea | |
| 2002/0085526 A1 | 7/2002 | Belcea | |
| 2002/0089945 A1 | 7/2002 | Belcea | |
| 2002/0150075 A1 | 10/2002 | Belcea | |
| 2002/0181423 A1 | 12/2002 | Chen et al. | |
| 2003/0012176 A1* | 1/2003 | Kondylis et al. | 370/348 |
| 2003/0058883 A1* | 3/2003 | Larson et al. | 370/463 |
| 2003/0067901 A1 | 4/2003 | Schein et al. | |
| 2003/0091021 A1 | 5/2003 | Trossen et al. | |
| 2004/0209627 A1* | 10/2004 | Shiraga | 455/456.1 |

OTHER PUBLICATIONS

Goodman, D.J., et al.; "Packet Reservation Multiple Access for Local Wireless Communications"; IEEE Transactions on Communications, vol. 37, No. 8, Aug. 1989; pp. 885-889.

(Continued)

Primary Examiner—Eliseo Ramos-Feliciano
Assistant Examiner—Dai Phuong
(74) Attorney, Agent, or Firm—Edell, Shapiro & Finnan, LLC

(57) ABSTRACT

A multi-hop wireless Ad-Hoc network according to the present invention employs a voice reservation protocol. The protocol supports voice and data communication and incorporates retransmission and acknowledgement mechanisms. A TDMA frame architecture is dynamically selected depending on voice mode operation (e.g., simplex/duplex) and associated retransmission/acknowledgement mechanisms. A source node transmits a reservation packet that embeds TDMA frame architecture and other information. The packet is transmitted to a destination node and is further piggybacked on existing neighbor discovery packets to reduce overhead. Each intermediate network node along the propagation path determines the manner in which to accomplish slot reservation based on the embedded information in the reservation packet. The protocol may use separate dedicated channels or a single channel for voice and data, and supports voice/data load balancing over different channels. In addition, the protocol may utilize speech silence and increased communication reliability to enhance performance.

44 Claims, 9 Drawing Sheets

OTHER PUBLICATIONS

Abdalla, Y., et al.; "PRMA with Reservation Subframe Protocol for Multimedia Services in Mobile Communication Networks"; IEEE, 2001; pp. 802-806.

HomeRF; "Quality of Service in the Home Networking Model"; HomeRF Working Group (www.homerf.org), 2001; 13 pages.

Li, M., et al.; "Collison Free Voice/Data Integrated Packet Reservation Multiple Access (CF-IPRMA) Protocol"; IEEE/ICPWC, 2000; pp. 528-531.

Lenzini, L., et al.; "CRDA: A Collison Resolution and Dynamic Allocation MAC Protocol to Integrate Data and Voice in Wireless Networks"; IEEE Journal on Selected Areas in Communications, vol. 19, No. 6, Jun. 2001; pp. 1153-1163.

Goodman, D.J., et al.; "Efficiency of Packet Reservation Multiple Access"; IEEE Transactions on Vehicular Technology, vol. 40, No. 1, Feb. 1991; pp. 170-176.

Metz, C.; "RSVP: General-Purpose Signaling for IP"; IEEE Internet Computing; May-Jun. 1999; pp. 95-99.

Pond, L.C., et al.; "A Distributed Time-Slot Assignment Protocol for Mobile Multi-Hop Broadcast Packet Radio Networks"; IEEE, 1989; 5 pages.

Young, C.D.; "USAP: A Unifying Dynamic Distributed Multichannel TDMA Slot Assignment Protocol"; IEEE, 1996; pp. 235-239.

Braden, R., et al.; "Resource Reservation Protocol (RSVP)"; RFC 2205, Sep. 1997; 83 pages.

Mingyuan, Li., et al; "Collison Free Packet Reservation Multiple Access (CF-PRMA) Protocol"; ICCT'94, 1994, pp. 1424-1427.

* cited by examiner

METHOD AND APPARATUS FOR DYNAMIC VOICE RESERVATION WITHIN WIRELESS NETWORKS

BACKGROUND OF THE INVENTION

1. Technical Field

The present invention pertains to wireless networks employing voice reservation protocols. In particular, the present invention pertains to multi-hop wireless Ad-Hoc networks employing voice reservation with dynamic selection of frame architectures depending on voice mode operation (e.g., simplex/duplex) and associated retransmission/acknowledgement mechanisms.

2. Discussion of the Related Art

Wireless Ad-Hoc networks may transfer information in the form of voice and data. However, transfer of voice information within such networks has more stringent requirements relative to those for data transfer since voice information is transferred as a continuous stream of packets with each packet representing a frame of voice data that has to be received in correct time order. If a frame is received late, the frame is considered lost. In a tactical environment, an acceptable delay is typically required to be on the order of 50 ms/hop (e.g., milliseconds per hop) with a completion rate in the approximate range of 95% to 99%.

Time Division Multiple Access (TDMA) is a scheme that allows plural users to share the same communication media. The TDMA frame may be utilized for integration of voice and data, where the TDMA frame is divided between voice and data, while still sharing the same channel. Basically, each TDMA frame is partitioned into a quantity of time slots within which information (e.g., voice and/or data) may be transferred over the communication media between network sites. Plural users may reserve (or be assigned) different time slots within the TDMA frame to perform communications over the same communication media. The use of a TDMA architecture and a conventional Packet Reservation Multiple Access (PRMA) scheme was first proposed for voice communication between a base station and a mobile user. However, PRMA may further be applied for home networking technologies.

The key feature of PRMA is that a time slot is reserved by a user through an uplink and is later confirmed by the base station through a down link. However, users have to contend for any unused time slots in order to get a reservation. The original PRMA scheme allows plural users to contend for time slot reservation and suffer the consequence of collisions (e.g., plural transmissions on the same time slots for reservations). The PRMA scheme was later refined by inserting dedicated reservation time slots in the TDMA frame. Plural users utilize these dedicated time slots by using conventional protocols (e.g., ALOHA, CSMA, etc.) to make time slot reservations.

In the original PRMA scheme, a user intending to send voice information uses an available time slot to inform the base station of a reservation. In a tactical environment, the base station does not exist. Therefore, the reservation must be set up through a signaling protocol. One conventional signaling protocol is RSVP which conveys the application resource requirements to the network. The reservation in this protocol is receiver oriented. Typically, the source network site or sender transmits a path message down stream to the receiver which returns a reservation request (RESV) message up stream to the sender. The RESV message travels hop by hop from the receiver to the source. The resources are allocated in response to intermediate routers determining availability of sufficient resources to satisfy the request.

The related art described above suffers from several disadvantages. In particular, the techniques described above concern either cellular networks or home networks. The cellular network is a one-hop network (e.g., between the base station and the mobile user), while the home network consists of a down-link and up-link similar to the cellular network infrastructure. Thus, these techniques are limited to specific types of networks and do not address the environments of Ad-Hoc multi-hop networks. With respect to multi-hop packet radio networks, there are protocols dealing with a distributed time-slot assignment. However, this application is primarily limited to data transfer. Although the enhanced PRMA scheme employs dedicated time slots for reservations, the resources available in the TDMA frame for voice information are reduced, while controlling the number of time slots required for a successful time slot reservation is difficult and complex.

Basically, if time slots can be successfully reserved, collision-free voice communication can be maintained. However, the techniques described above generally do not address the issue of packet loss due to external interference. In a tactical environment, interference could be due to unfriendly jamming. Although spread spectrum technology can provide some resistance, packet loss may still occur depending on the number and strength of the interference sources.

In a home environment, interference may originate from a microwave oven. Although the conventional HomeRF architecture addresses packet loss due to external interference, this architecture is simplified and limited due to the one-hop nature of the home network.

In addition, the RSVP protocol is receiver oriented, where the reservation is made only on the reverse path. Further, with respect to TDMA slot reservation, each network node cannot independently make slot reservations since the slot reservation of one node depends upon the reservation of the previous nodes.

OBJECTS AND SUMMARY OF THE INVENTION

Accordingly, it is an object of the present invention to employ a voice reservation protocol within multi-hop wireless Ad-Hoc networks that supports voice and data communication and incorporates retransmission and acknowledgement mechanisms.

It is another object of the present invention to employ a voice reservation protocol within multi-hop wireless Ad-Hoc networks that dynamically selects a TDMA frame architecture depending on voice mode operation (e.g., simplex/duplex) and associated retransmission/acknowledgement mechanisms.

Yet another object of the present invention is to employ a source-oriented reservation scheme within multi-hop wireless Ad-Hoc networks, where each intermediate network node along the propagation path determines the manner to accomplish slot reservation based upon embedded reservation information within data packets.

Still another object of the present invention is to employ a voice reservation protocol within multi-hop wireless Ad-Hoc networks that is capable of using separate dedicated channels or a single channel for voice and data.

A further object of the present invention is to employ a voice reservation protocol within multi-hop wireless Ad-Hoc networks that supports voice/data load balancing over different channels.

Yet another object of the present invention is to employ a voice reservation protocol within multi-hop wireless Ad-Hoc networks that utilizes speech silence and increased communication reliability to enhance performance.

The aforesaid objects may be achieved individually and/or in combination, and it is not intended that the present invention be construed as requiring two or more of the objects to be combined unless expressly required by the claims attached hereto.

According to the present invention, a multi-hop wireless Ad-Hoc network employs a voice reservation protocol. The protocol supports voice and data communication and incorporates retransmission and acknowledgement (ACK) mechanisms. A TDMA frame architecture is dynamically selected depending on voice mode operation (e.g., simplex/duplex) and associated retransmission/acknowledgement mechanisms. A source-oriented reservation procedure is utilized, where a source node transmits a reservation packet that embeds TDMA frame architecture and other information. The packet is transmitted to a destination node and is further piggybacked on existing neighbor discovery packets to reduce network and protocol overhead. Each intermediate network node along the propagation path determines the manner in which to accomplish slot reservation based on the embedded information in the reservation packet. The protocol may use separate dedicated channels or a single channel for voice and data, and supports voice/data load balancing over different channels. In addition, the protocol may utilize speech silence and increased communication reliability to enhance performance.

The present invention provides several advantages. In particular, the present invention applies to multi-hop wireless Ad-Hoc networks. Since jamming and other interference are common in tactical environments employing wireless Ad-Hoc networks, retransmissions and acknowledgement (ACK) mechanisms are included in the TDMA frame structure. Various different TDMA frame architectures are provided depending upon the protection and the quality of voice information. The selection of an architecture is performed dynamically on the basis of resource availability. The voice traffic and resource reservation slots can be on the same channel or, preferably, on different channels. In this case, the resource reservation process can use the data access schemes in the data channel to accomplish the reservation task. Since the present invention may employ a different frequency channel for voice information, the number of time slots used for reservation in the data channel has no impact on the resources available for voice traffic. In other words, more voice circuits can be supported since reservation is performed on a different channel.

Although the voice and data traffic can share the same channel within the present invention, the preferred manner is to utilize different channels. This manner obviates adverse effects of heavy data traffic and large message size that may require excessive resources and simplifies voice time slot management while removing dependence upon data time slot utilization. In other words, resource management is simplified since voice channels are not competing for data time slots. However, when traffic is light, the use of separate channels may bring inefficiencies that waste resources either in the data channel or in the voice channel. In order to compensate for these inefficiencies, the present invention employs a dynamic scheme to apply voice traffic to the data channel and data traffic to the voice channel.

Moreover, the present invention employs a source oriented signaling protocol (as opposed to the receiver oriented RSVP protocol described above). The reservation starts on the forward path between source and destination nodes, while the reservation confirmation is performed on the return or reverse path. This forward reservation approach enables neighbors to be informed of the reservation immediately and enhances maintenance of correct slot time sequence. A reservation packet sent by the source node embeds information about the integrated path, slot number and the selected frame architecture, wherein each intermediate node determines the manner in which to accomplish the slot reservation based upon the embedded information.

In addition, the voice reservation protocol employed by the present invention may operate in a full-duplex mode, while a voice detector may be employed to detect voice activity and filter out unwanted silence intervals, thereby conserving bandwidth.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
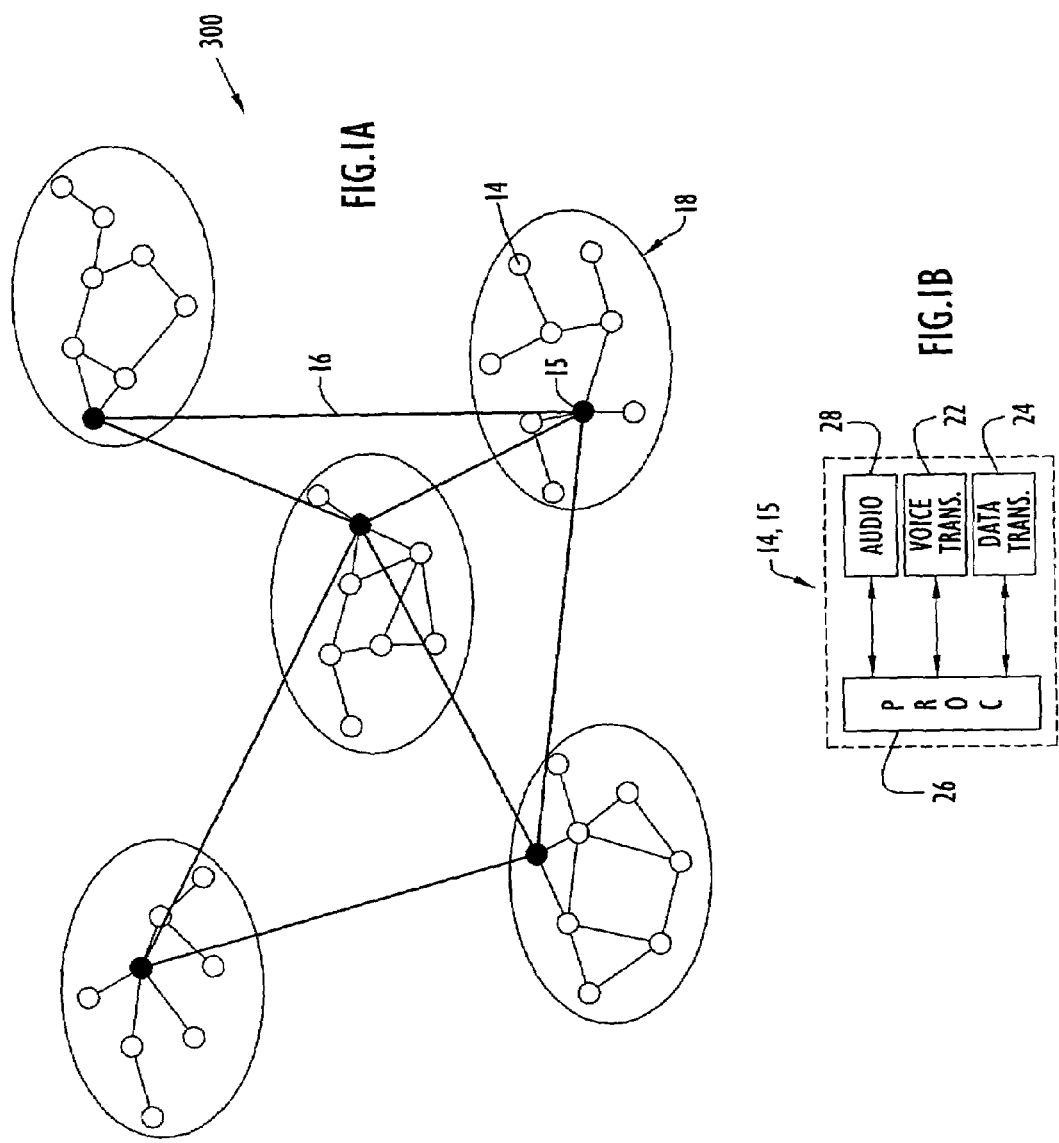
FIG. 1A is a diagrammatic illustration of network nodes according to the present invention arranged in an exemplary communication network.
FIG. 1B is a block diagram of a network node of FIG. 1A.

An exemplary network architecture that may be employed by the present invention is a multi-hop wireless Ad-Hoc network. This type of network does not include an infrastructure (e.g., there is no base station as in a cellular network, where a single-hop environment of a cellular network becomes a special case) and may be utilized in a hostile network environment (e.g., a tactical battlefield, etc.) with unfriendly jamming. An exemplary wireless Ad-Hoc network including network nodes according to the present invention is illustrated in FIG. 1A. Specifically, wireless network 300 includes a plurality of nodes 14 arranged in islands 18. Each island is in the form of a flat multi-hop network and includes corresponding island member nodes 14 (e.g., with an approximate maximum of fifty nodes) with one of those member nodes designated as an island head node 15. These island arrangements form a first tier of network 300 and facilitate communication within an island between the island head and member nodes and between the member nodes themselves. The head nodes of each island are in communication with each other and form a backbone network 16. The backbone network essentially forms a second tier of network 300 and facilitates communications between nodes of different islands (e.g., generally providing communications over greater distances). For example, a node A from a first island desires to transmit a message to node B of a second island. Node A transmits the message to a corresponding head node C of the first island that utilizes the second tier of network 300 to forward the message to a head node D of the second island. Head node D subsequently forwards the received message to destination node B. Alternatively, nodes 14 may be arranged to form a network including a single or any quantity of tiers.

A network node 14 according to the present invention is illustrated in FIG. 1B. In general, each radio or node 14 within network 300 has a voice channel including a Time Division Multiple Access (TDMA) frame architecture. Preferably, node 14 includes at least two frequency channels, wherein one channel is utilized for voice information and another channel is utilized for data. Specifically, node 14 includes a voice transceiver 22, a data transceiver 24, a processor 26 and audio devices 28. The processor is preferably implemented by a conventional microprocessor or controller and controls the node to transmit and receive messages in accordance with the routing and communication protocols described below. Voice transceiver 22 is preferably implemented by a conventional transceiver (e.g., transmitter and receiver) that transmits and receives messages, preferably in the form of radio frequency (RF) signals, over a voice channel in accordance with processor instructions. Similarly, data transceiver 24 is preferably implemented by a conventional transceiver (e.g., transmitter and receiver) that transmits and receives messages, preferably in the form of radio frequency (RF) signals, over a data channel in accordance with processor instructions. Audio devices 28 preferably include various conventional audio devices (e.g., microphone, speaker, etc.) and optional circuitry (e.g., to process and perform conversions of voice signals between digital and analog domains, etc.) to transfer audio signals between the node and a user. The audio devices are typically coupled to processor 26 for control and transfer of information to facilitate transmission and reception of voice signals. The node further includes an identifier (e.g., a code or identification number) to identify the particular node and a database (not shown) to store information pertaining to neighboring nodes to facilitate reservations and/or routing as described below. A head node 15 is substantially similar to node 14 described above. Voice reservation may utilize the data channel and employ any suitable data channel access schemes (e.g., CSMA, HAMA or any other collision free protocols).

The network preferably employs a link-state type of routing protocol. The database of each node 14 (e.g., island head and member nodes) maintains information enabling that node to determine appropriate paths for routing messages through the network. The information typically relates to links between the various network nodes. The node databases are synchronized in accordance with the routing protocol by transference of database update packets or messages between nodes that provide network connectivity information. In addition, each node (e.g., island head and member nodes) periodically broadcasts a beacon type or neighbor discovery packet. This packet basically advertises the presence of a node within the network and is typically utilized by nodes for "keep alive" and neighbor discovery purposes.

In order to facilitate wireless communications, the present invention employs Time Division Multiple Access (TDMA) frame schemes or architectures. Network nodes dynamically select an appropriate TDMA frame architecture to utilize for a communication. The TDMA schemes preferably include four frame architectures that are based upon support for retransmissions during voice traffic and simultaneous voice transmissions between sender and receiver (e.g., full duplex or simplex). When a reservation is successfully accomplished, there is normally no voice packet loss in an interference-free environment. Since packet loss may occur in the presence of interference, the TDMA frame structures include a retransmission mechanism. The frame architectures basically include the various combinations of the retransmission and simultaneous voice transmission features (e.g., duplex/retransmission, simplex/retransmission, duplex/no retransmissions and simplex/no retransmissions) as described below.

Initially and by way of example only, the types of TDMA frame architectures employed by the present invention are described with respect to an exemplary network including two hops between a node A and a node C, where each TDMA frame includes N time slots and every frame of voice information can be sent out within one time slot. Thus, a forward communication path may be from node A to an intermediate or router node B (e.g., first hop), and from node B to node C (e.g., second hop). However, the TDMA frame architectures may vary to accommodate any network configurations employed by the present invention.

Figure 2:
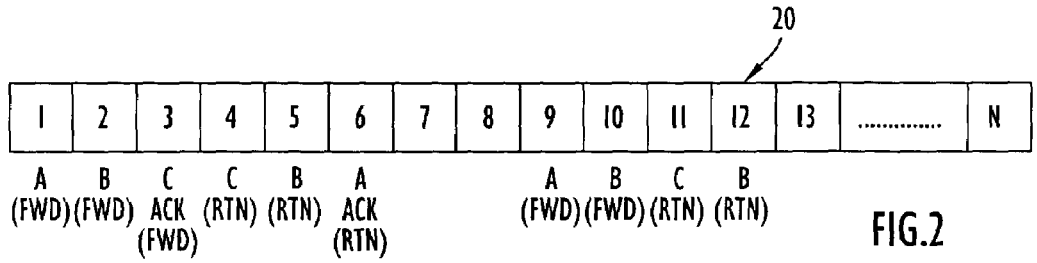
FIG. 2 is a diagrammatic illustration of an exemplary TDMA frame architecture supporting duplex voice communications (e.g., simultaneous voice communications between sender and receiver) and retransmissions.

An exemplary type of TDMA frame architecture employed by the present invention for network communications supporting full duplex communications and retransmissions is illustrated in FIG. 2. Specifically, TDMA frame architecture 20 includes transmission slots (e.g., slots 1–6 with acknowledgement (ACK) slots 3 and 6) and retransmission slots (e.g., slots 9–12). In a forward (FWD) communication path (e.g., from node A to node C), node A generates voice packets that are forwarded by node B to node C. For example, node A may reserve transmission slot 1 and retransmission slot 9 (e.g., each associated with label 'A (FWD)' in FIG. 2), router node B may reserve transmission slot 2 and retransmission slot 10 (e.g., each associated with label 'B (FWD)' in FIG. 2) and node C may reserve ACK slot 3 (e.g., associated with label 'C ACK (FWD)' in FIG. 2). Thus, slot 1 is utilized for communications from node A to node B (e.g., by node A for transmissions and by node B to receive transmissions from node A), while slot 2 is utilized for communications from node B to node C. Slot 3 is utilized by node C for explicit acknowledgements (ACK).

The example shows that the retransmission slots for a frame architecture start at time slot N/2+1 when N is set to sixteen. If node A reserves slot S, the retransmission slot may start at a slot number greater than S+P, where P is the estimated maximum number of hops. The number of required slots in a frame may be estimated as follows:

$$N = \frac{R_c T_f}{R_s T_f + E + \beta}$$ (Equation 1)

where $R_c$ represents the channel rate, $R_s$ represents the voice coding rate, $E$ represents the protocol overhead, $\beta$ is a safety margin and $T_f$ represents the frame period. The slot size or time interval of each slot may be expressed as $T_f/N$. The slot size is large enough to allow the transmission of voice packets.

In a return (RTN) communication path (e.g., from node C to node A), node C generates voice packets that are relayed by node B to node A. By way of example only, node C may reserve transmission slot 4 and retransmission slot 11 (e.g., each associated with the label 'C (RTN)' in FIG. 2). Node B may reserve transmission slot 5 and retransmission slot 12 (e.g., each associated with the label 'B (RTN)' in FIG. 2), while node A may reserve acknowledgement (ACK) slot 6 (e.g., associated with the label 'A ACK (RTN)' in FIG. 2). Thus, architecture 20 includes voice information for both the forward and return communication paths to support full duplex communications and provides slots for retransmission of voice information.

The transmissions from intermediate or router node B are considered as implicit acknowledgements (ACK), thereby obviating the need for explicit ACK slots. For example, node A can hear or receive the voice packets sent from node B to node C, thereby informing node A that the transmitted voice packets have been received by node B. If node A does not hear or receive such transmission after occurrence of one voice slot, node A considers the transmitted voice packet to be lost and retransmits that packet via retransmission slot 9. Since node C does not relay the received voice packet, node C needs to send an explicit acknowledgement (ACK) in order to inform node B that a transmitted voice packet has been received. If node B does not hear or receive an explicit ACK after the occurrence of one time slot, node B considers the transmitted voice packet to be lost and retransmits that packet using retransmission slot 10.

Once several frames have passed through the forward communication path, node C starts sending voice bursts to node A on the return communications path using transmission slot 4. If node C does not hear or receive the transmissions from node B to node A using transmission slot 5 (e.g., an implicit acknowledgement as described above), node C considers the transmitted voice packet to be lost and retransmits that packet using retransmission slot 11. Since node A is the destination for the return path and does not relay the received voice packet, node A needs to send an explicit acknowledgement (ACK) in order to inform node B that a transmitted voice packet has been received. If node B does not hear or receive an explicit ACK from node A using slot 6, node B retransmits that packet using retransmission slot 12. The number of slots required for communication in this type of TDMA architecture is 4H+2, where H is the total number of hops.

Figure 3:
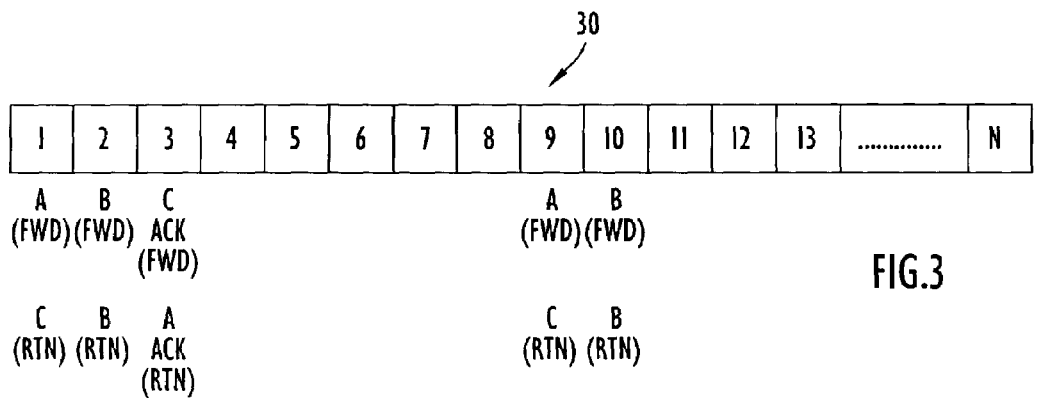
FIG. 3 is a diagrammatic illustration of an exemplary TDMA frame architecture supporting simplex voice communications (e.g., sender and receiver communicate one at a time) and retransmissions.

An exemplary type of TDMA frame architecture employed by the present invention for network communications supporting simplex communications and retransmissions is illustrated in FIG. 3. Specifically, TDMA frame architecture 30 includes transmission slots (e.g., slots 1–3 with acknowledgement (ACK) slot 3) and retransmission slots (e.g., slots 9–10). In a forward (FWD) communication path (e.g., from node A to node C), node A generates voice packets that are forwarded by node B to node C. By way of example only, node A may reserve transmission slot 1 and retransmission slot 9 (e.g., each associated with label 'A (FWD)' in FIG. 3), router node B may reserve transmission slot 2 and retransmission slot 10 (e.g., each associated with label 'B (FWD)' in FIG. 3) and node C may reserve ACK slot 3 (e.g., associated with label 'C ACK (FWD)' in FIG. 3). Thus, slot 1 is utilized for communications from node A to node B (e.g., by node A for transmissions and by node B to receive transmissions from node A), while slot 2 is utilized for communications from node B to node C. Slot 3 is utilized by node C for explicit acknowledgements (ACK).

Since architecture 30 supports simplex communications, a return communication path (e.g., from node C to node A) similarly utilizes slots 1, 2 and 3 for transmission and slots 9 and 10 for retransmissions, where node C generates voice packets that are relayed by node B to node A. By way of example only, node C may utilize transmission slot 1 and retransmission slot 9 (e.g., each associated with the label 'C (RTN)' in FIG. 3). Node B may utilize transmission slot 2 and retransmission slot 10 (e.g., each associated with the label 'B (RTN)' in FIG. 3), while node A may utilize acknowledgement (ACK) slot 3 (e.g., associated with the label 'A ACK (RTN)' in FIG. 3). Once node A finishes talking or transmitting voice packets, node A becomes silent and waits for a response (e.g., voice packets) from node C. Node C may use the same slots node A utilized. This arrangement is reasonable since both the sender and receiver presumably do not speak or transmit voice packets at the same time. Thus, although the forward and return communication paths share the same time slots, collisions do not occur.

The transmissions from intermediate or router node B are considered as implicit acknowledgements (ACK), thereby obviating the need for explicit ACK slots as described above. For example, node A can hear or receive the voice packets sent from node B to node C, thereby informing node A that the transmitted voice packets have been received by node B. If node A does not hear or receive such transmission after occurrence of one voice slot, node A considers the transmitted voice packet to be lost and retransmits that packet via retransmission slot 9. Since node C does not relay the received voice packet, node C needs to send an explicit acknowledgement (ACK) in order to inform node B that a transmitted voice packet has been received. If node B does not hear or receive an explicit ACK after the occurrence of one time slot, node B considers the transmitted voice packet to be lost and retransmits that packet using retransmission slot 10.

Once several frames have passed through the forward communication path, node C starts sending voice bursts to node A on the return communications path using transmission slot 1. If node C does not hear or receive the transmissions from node B to node A using transmission slot 2 (e.g., an implicit acknowledgement as described above), node C considers the transmitted voice packet to be lost and retransmits that packet using retransmission slot 9. Since node A is the destination for the return path and does not relay the received voice packet, node A needs to send an explicit acknowledgement (ACK) in order to inform node B that a transmitted voice packet has been received. If node B does not hear or receive an explicit ACK from node A using slot 3, node B retransmits that packet using retransmission slot 10. The number of slots required for communication in this type of TDMA frame architecture is 2H+1, where H is the total number of hops.

Figure 4:
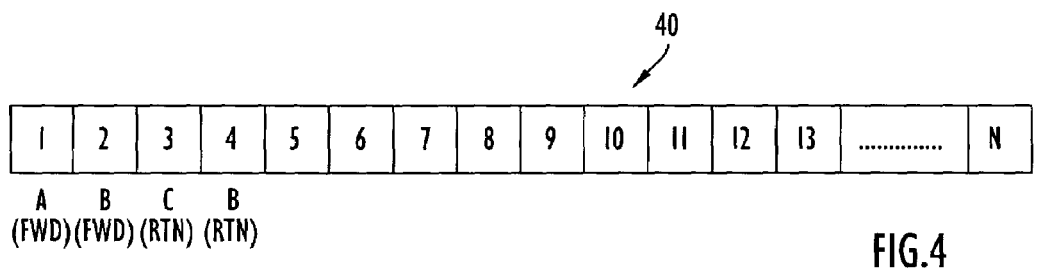
FIG. 4 is a diagrammatic illustration of an exemplary TDMA frame architecture supporting duplex voice communications (e.g., simultaneous voice communications between sender and receiver) without retransmissions.

An exemplary TDMA frame architecture employed by the present invention for network communications supporting full duplex communications without retransmissions is illustrated in FIG. 4. Specifically, TDMA frame architecture 40 includes transmission slots (e.g., slots 1–4, without retransmission and acknowledgement (ACK) slots). In a forward (FWD) communication path (e.g., from node A to node C), node A generates voice packets that are forwarded by node B to node C. By way of example only, node A may reserve transmission slot 1 (e.g., associated with label 'A (FWD)' in FIG. 4), while router node B may reserve transmission slot 2 (e.g., associated with label 'B (FWD)' in FIG. 4). Thus, slot 1 is utilized for communications from node A to node B (e.g., by node A for transmissions and by node B to receive transmissions from node A), while slot 2 is utilized for communications from node B to node C.

In a return (RTN) communication path (e.g., from node C to node A), node C generates voice packets that are relayed by node B to node A. By way of example only, node C may reserve transmission slot 3 (e.g., associated with the label 'C (RTN)' in FIG. 4), while node B may reserve transmission slot 4 (e.g., associated with the label 'B (RTN)' in FIG. 4). Thus, architecture 40 includes voice information for both the forward and return communication paths to support full duplex communications. The number of slots required for communication in this type of TDMA architecture is 2H, where H is the total number of hops.

Figure 5:
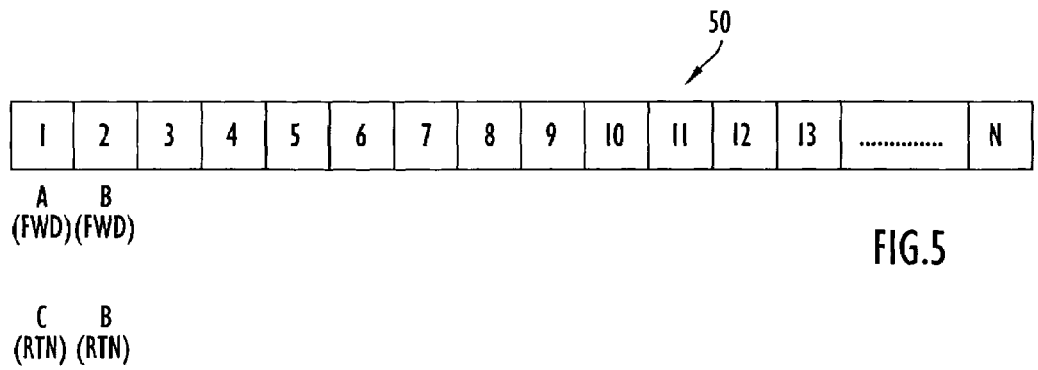
FIG. 5 is a diagrammatic illustration of an exemplary TDMA frame architecture supporting simplex voice communications (e.g., sender and receiver communicate one at a time) without retransmissions.

An exemplary TDMA frame architecture employed by the present invention for network communications supporting simplex communications without retransmissions is illustrated in FIG. 5. Specifically, TDMA frame architecture 50 includes transmission slots (e.g., slots 1–2, without retransmission and acknowledgement (ACK) slots). In a forward (FWD) communication path (e.g., from node A to node C), node A generates voice packets that are forwarded by node B to node C. By way of example only, node A may reserve transmission slot 1 (e.g., associated with label 'A (FWD)' in FIG. 5), while router node B may reserve transmission slot 2 (e.g., associated with label 'B (FWD)' in FIG. 5). Thus, slot 1 is utilized for communications from node A to node B (e.g., by node A for transmissions and by node B to receive transmissions from node A), while slot 2 is utilized for communications from node B to node C.

Since architecture 50 supports simplex communications, a return communication path (e.g., from node C to node A) similarly utilizes slots 1 and 2 for transmission. By way of example only, node C may utilize transmission slot 1 (e.g., associated with the label 'C (RTN)' in FIG. 5), while node B may utilize transmission slot 2 (e.g., associated with the label 'B (RTN)' in FIG. 5). Once node A finishes talking or transmitting voice packets, node A becomes silent and waits for a response (e.g., voice packets) from node C. Node C may use the same slots utilized by node A as described above. The number of slots required for communication in this type of TDMA architecture is H, where H is the total number of hops.

The TDMA frame architectures of the present invention support retransmissions as described above. If different frequency channels are used for transmissions and retransmissions, the probability of a successful communication is enhanced for retransmissions. Accordingly, the present invention may assign retransmission slots to another frequency channel to achieve the enhanced probability of success. In particular, a network node transmits voice packets at the assigned or reserved time slots for transmissions. When a retransmission is required, the same voice packet is transmitted using retransmission slots over a different frequency channel. In order to simplify switching channels, the transmission slots are assigned or reserved on the first half of a frame, while the retransmission slots are assigned on the second half of the frame. The channel in this approach is switched based on transmission and retransmission slots.

Figure 6:
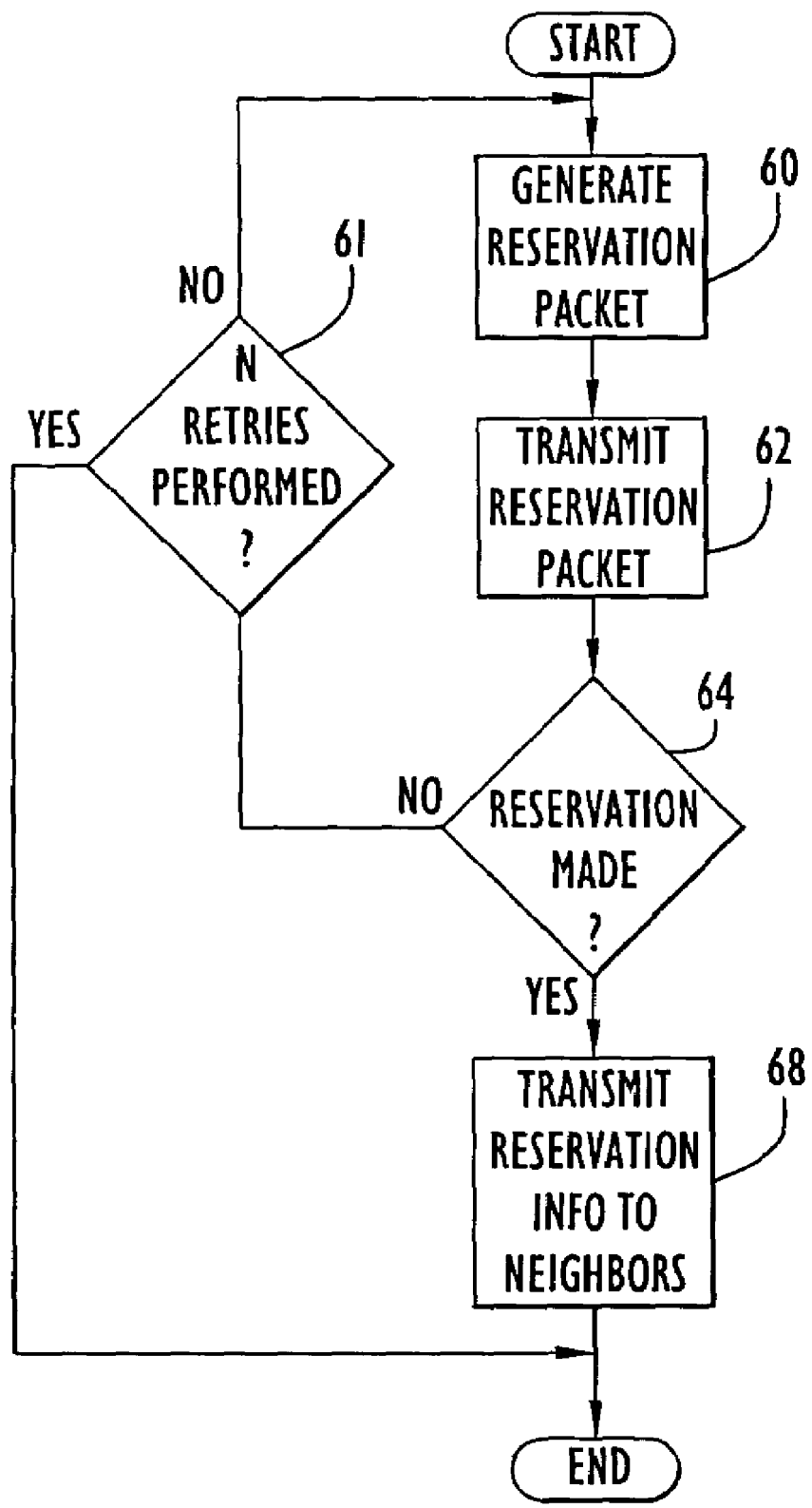
FIG. 6 is an exemplary procedural flow chart illustrating the manner in which a network node requests reservation of communication links for transfer of voice information according to the present invention.

Network nodes of the present invention basically perform reservation request, reservation confirmation, voice communication and voice termination in order to facilitate communications within the network as described below. A network node according to the present invention establishes communication links to commence voice communication by requesting a reservation via a reservation packet as illustrated in FIG. 6. Specifically, a network node 14 (FIG. 1A) initiating communications with another network node generates a reservation packet at step 60. Each reservation packet includes sequence of routing path aggregate, slot assignment aggregate, frame architecture assignment aggregate, available resources, source address and next hop address. The routing path aggregate is a sequence of nodes the voice packets traverse to a destination node, while the slot assignment aggregate is the sequence of slot assignments this sequence of routing reserves.

The frame architecture assignment aggregate refers the TDMA frame architecture employed. The node selects the TDMA architecture based upon two configuration parameters, typically entered by a user. One parameter specifies the mode (e.g., full duplex or simplex) and the other parameter specifies a retransmission flag indicating support for retransmissions. The combination of the mode and retransmission flag yields a configuration number (e.g., a two bit parameter (e.g., with one bit specifying simplex or duplex mode and the other bit representing the retransmission flag), where each parameter value corresponds to a particular TDMA architecture). The node further determines from node resources the particular configuration number (e.g., TDMA architecture) the node may support. If the supportable configuration number is different from the desired configuration (e.g., entered by a user), the supportable configuration number has precedence.

The generated packet is transmitted by the node at step 62, preferably over the data channel. The reservation packet basically travels from the initiating node to the destination node hop by hop using a routing path supplied from a routing module (e.g., within the node processor) that analyzes routing information within a node database to determine an appropriate communication path.

Once the node has made a reservation (e.g., the reservation has been confirmed as described below) at step 64, reservation information (e.g., slot, architecture, the number of empty slots, etc.) is transmitted to neighboring nodes over the data channel at step 68. In order to limit additional overhead to the network, the reservation information is placed within beacon or neighbor discovery packets that are transmitted periodically to discover neighboring nodes. This obviates the need for a broadcast packet to send the reservation information and provides each node with reservation information of neighboring nodes within two hops from that node. If the reservation is not made within a preset quantity of attempts as determined at step 61, processing of the reservation terminates.

Figure 7A:
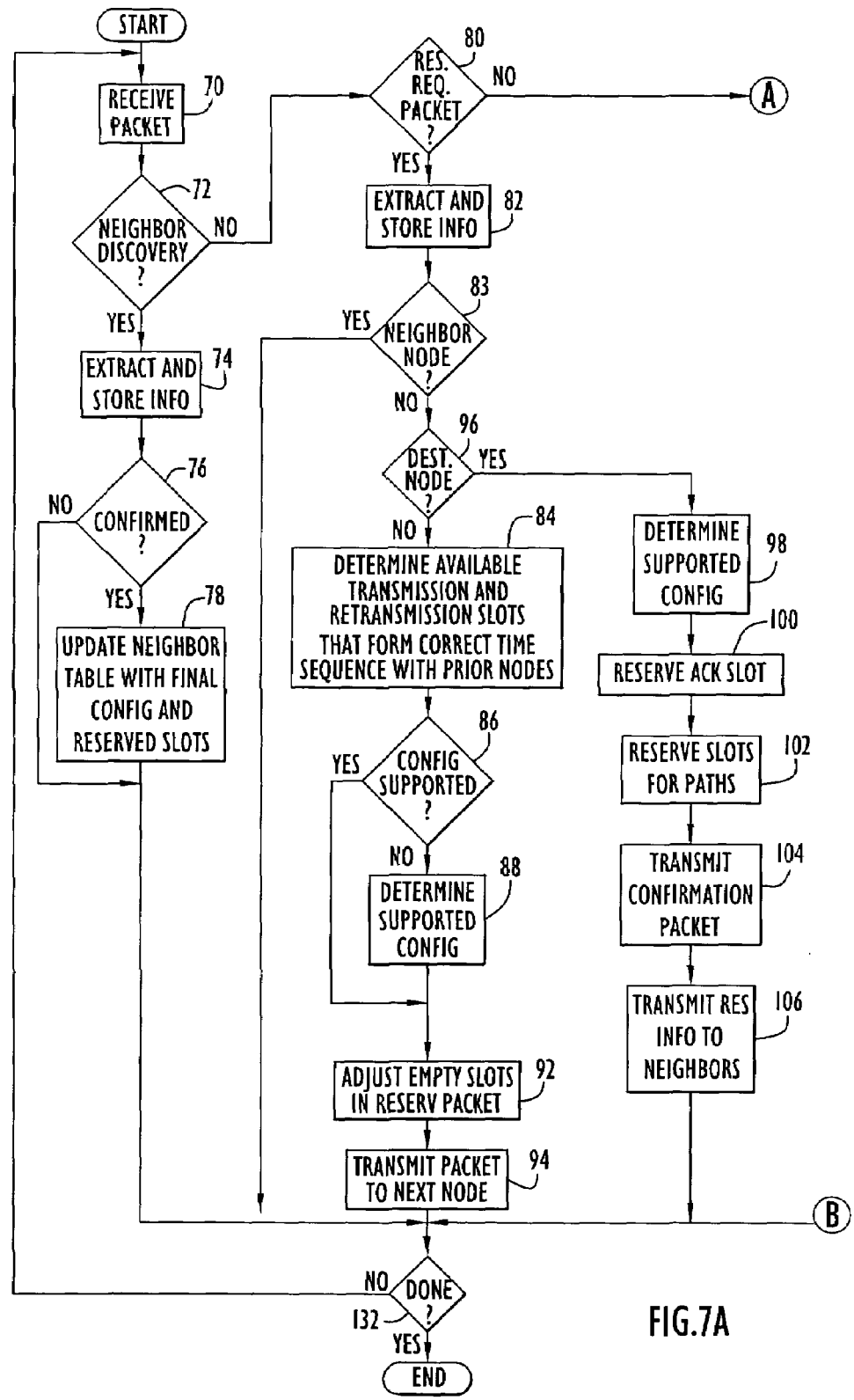
FIGS. 7A–7B are an exemplary procedural flowchart illustrating the manner in which a network node processes the reservation request according to the present invention.
Figure 7B:
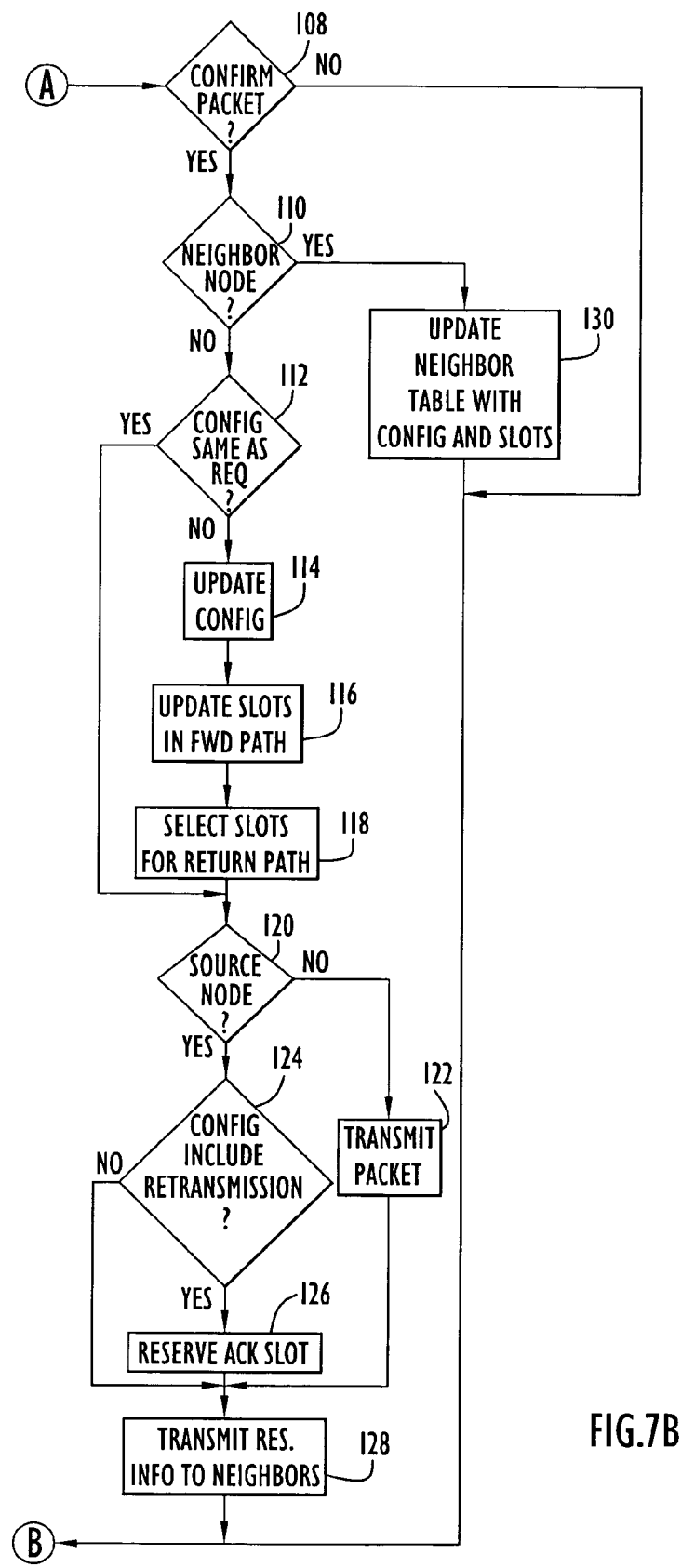

The manner in which a network node according to the present invention processes the reservation packet and reservation information is illustrated in FIGS. 7A–7B. Specifically, a network node receives a packet at step 70. If the packet is a neighbor discovery packet containing reservation information as determined at step 72, the node extracts information (e.g., slot, architecture, source, etc.) from the reservation packet at step 74 to avoid utilization of the same slots a transmitting node has reserved. When the reservation has been confirmed as determined at step 76 (as described below), the reservation information is utilized to update a neighbor table in the node database with the final configuration and reserved slots at step 78. If further processing is to commence as determined at step 132, the node receives and processes the next packet at step 70.

When the received packet is a reservation packet as determined at step 80, the node extracts and stores the reservation information from the packet at step 82. If the node is a neighboring node that happens to hear the reservation request (e.g., the node is not within the routing path) as determined at step 83 and further processing is to commence as determined at step 132, the node receives and processes the next packet at step 70 as described above.

If the node is an intermediate node within the routing path as determined at step 96, the node determines available transmission and retransmission slots based on the extracted information from the reservation packet relating to assignments or reservations of the previously traversed nodes at step 84. In particular, the node retrieves the slot number the previously traversed nodes have reserved and determines the earliest available empty time slot for transmission that forms the correct time sequence with the slot assignments or reservations of the previous nodes. The determined slot should avoid collisions since the node has reservation information of neighboring nodes within two hops. Subsequently, the node reserves an earliest available empty retransmission slot that forms the correct time sequence with the retransmission slots of the previous nodes. The retransmission slots are reserved in accordance with selection of a TDMA architecture supporting retransmissions.

If the configuration number (e.g., TDMA architecture) received within the reservation packet can not be supported by the node as determined at step 86, the node determines the configuration number (e.g., TDMA architecture) that can be supported at step 88 and makes the required reservation. This is accomplished by altering the configuration number in the reservation packet as described below. The node further retrieves the total number of empty slots, $S_p$, received within the reservation packet and determines the quantity of empty slots, $S_n$, associated with the node. If $S_p$ is greater than $S_n$, then the node replaces $S_p$ in the reservation packet with $S_n$ at step 92. The updated packet, including the configuration number and reserved slots, is transmitted to the next node in the routing path at step 94. If further processing is to commence as determined at step 132, the node receives and processes the next packet at step 70 as described above.

If the node is the destination node as determined at step 96, the node determines the configuration that may be supported by each node in the routing path at step 98. Basically, the node is informed of the configuration number (e.g., TDMA architecture) of each node along the routing path via the reservation packet. The memory required for the architecture decreases with decreased complexity of the TDMA architecture as described above. Accordingly, the configuration number associated with a routing path node representing the least complex architecture (e.g., utilizing the least amount of memory) is the configuration number that can be supported by each node along the routing path. The node retrieves from the reservation packet the configuration number and the available resources for each traversed node. In accordance with this information and the total number of hops from the source node to the destination node, the destination node determines the configuration number each traversed node can support. The determined configuration number is inserted into a confirmation packet.

Once the configuration number is determined, the node reserves an additional acknowledgement (ACK) slot at step 100, depending upon the selected TDMA frame architecture. The node further reserves the transmission and retransmission slots for both the forward and return paths at step 102, depending upon the selected TDMA frame architecture. The node transmits a confirmation reply to the initiating or source node in the form of the confirmation packet that includes the final configuration number and the reserved slots at step 104. The reservation information is further transmitted to neighboring nodes via neighbor discovery packets at step 106. If further processing is to commence as determined at step 132, the node receives and processes the next packet at step 70 as described above.

If the received packet is a confirmation packet as determined at step 108, the node determines the node status (e.g., whether the node is a neighboring node of a routing path node and heard transmission of the confirmation packet) at step 110. When the node status is that of a neighboring node, the node retrieves the final configuration number and the reserved slots and updates the neighbor table within the node database accordingly at step 130. If further processing is to commence as determined at step 132, the node receives and processes the next packet at step 70 as described above.

When the node is the source node (e.g., initiating the reservation request) or an intermediate node along the routing path, the node determines whether the configuration within the confirmation packet is the same as the configuration number in the reservation request at step 112. If these configuration numbers are different, the configuration number is updated based upon the configuration number within the confirmation packet at step 114 and the reserved slots in the forward path are updated accordingly at step 116. The node further selects slots for the return path at step 118. If the node is an intermediate node along the routing path as determined at step 120, the updated information is inserted into the confirmation packet and transmitted to the next node in the path at step 122.

When the node is a source node as determined at step 120, the node determines whether the configuration number (e.g., TDMA architecture) supports retransmissions at step 124. If the configuration supports retransmissions, an acknowledgement (ACK) slot is further reserved at step 126 in the manner described above. The reservation information is sent by an intermediate or source node to neighboring nodes via neighbor discovery packets at step 128. If further processing is to commence as determined at step 132, the node receives and processes the next packet at step 70 as described above.

Figure 8:
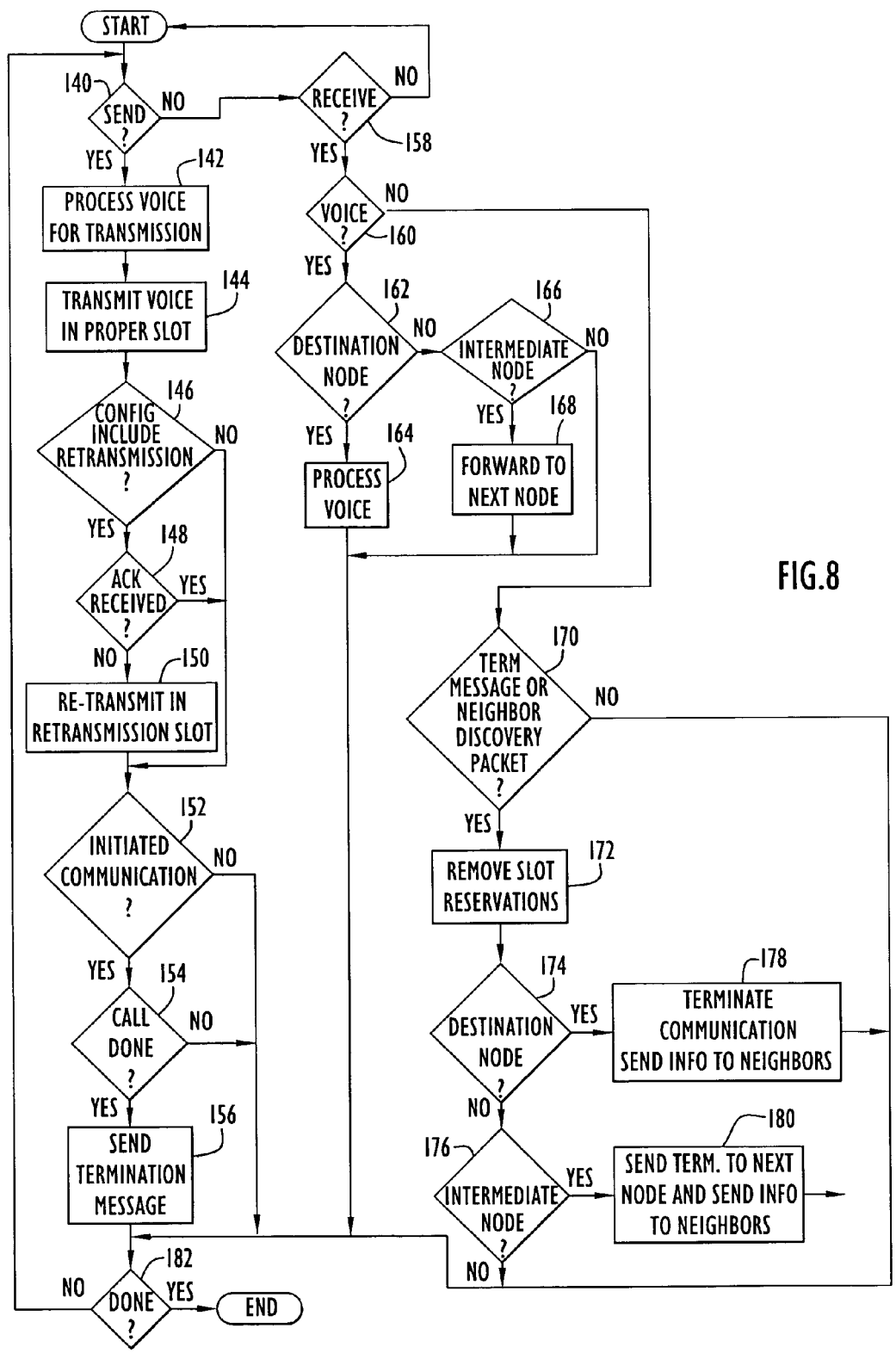
FIG. 8 is an exemplary flow chart illustrating the manner in which a network node transfers voice information over the reserved communication links according to the present invention.

Once the reservation has been accomplished, network nodes may facilitate voice communications via the reserved slots and determined frame architecture. The manner in which a network node according to the present invention facilitates voice communications is illustrated in FIG. 8. Specifically, the node determines whether to send voice information at step 140. This may be accomplished by detecting a node input mechanism (e.g., button, switch, etc.) manipulated by a user prior to entering voice signals. If the node is to transmit, the voice signals provided by a user are processed for transmission at step 142. Basically, analog voice signals from a user are entered, digitized and compressed by node audio devices 28 (e.g., a microphone, speech coder, etc.) (FIG. 1B). The number of slots available in a frame depends upon the speech coding rate and the channel data rate as described above. The encoded voice data bits are generated each frame and are transmitted in the proper reserved time slot over the voice channel to the next node or hop in the routing path at step 144.

If the configuration number (e.g., TDMA frame architecture) supports retransmission as determined at step 146, the node determines the presence of an acknowledgement at step 148. Basically, the transmission from the next hop is monitored by the node. If the node hears the packet transmission from the next hop, this is considered as an implicit acknowledgement and no retransmission is necessary. If the voice packet reaches the destination node, an explicit acknowledgement (ACK) is required. This ACK is transmitted in the reserved or assigned ACK slot. When no acknowledgement (e.g., implicit or explicit ACK) is received within a predetermined time interval at step 148, the node retransmits the voice packet in the reserved or assigned retransmission slot at step 150. The retransmission is preferably performed only once since retransmissions occupy several slots, thereby reducing simultaneous voice transmissions. However, the retransmissions may be performed any quantity of times.

If the node initiated communications (e.g., transmitted the reservation request) as determined at step 152 and a user indicated to end the communication (e.g., via a user input mechanism on the node, such as a button or switch) as determined at step 154, the node transmits a termination message along the routing path determined by the routing module at step 156.

When the node is to receive voice related transmissions as determined at steps 158 and 160, the node determines the node status as a destination node at step 162. If the node is the destination node, the voice data is processed at step 164 via node processor 26 and audio devices 28 for transfer to a user (e.g., via a node speaker, etc.) in a comprehensible manner. This may be accomplished by the node processor and/or circuitry within the audio devices. When the node is an intermediate node along the routing path as determined at step 166, the voice data is forwarded to the next node or hop in the routing path at step 168.

If the node receives a termination message or a neighbor discovery packet with termination information as determined at step 170, the node removes the slot reservation at step 172, where the slots become available for future use.

When the node is a destination node as determined at step 174, the node terminates the communication with the source node and transmits termination information to neighboring nodes via the neighbor discovery packets to remove the slot reservation at step 178. When the node is an intermediate node along the routing path as determined at step 176, the node forwards the termination message to the next node in the routing path and transmits termination information to neighboring nodes via the neighbor discovery packets to remove the slot reservation at step 180. The node processes voice communications as described above until processing ceases (e.g., shut down, etc.) as determined at step 182.

During voice communication, there are long silence intervals after one speaker finishes talking and waits for a response from the other speaker. These silence intervals do not contribute to the voice intelligence and removal of these intervals can conserve bandwidth for other use. Accordingly, the present invention may employ a silence detector to detect these silence intervals to prevent transmission of data bits during silence. An exemplary silence detector that may be employed by the present invention to render voicing decisions in background noise is disclosed in U.S. Pat. No. 5,680,508 (Liu), the disclosure of which is incorporated herein by reference in its entirety. The silence detector may be implemented within the node processor and/or by hardware and/or software within the node to perform the silence detector functions.

Figure 9:
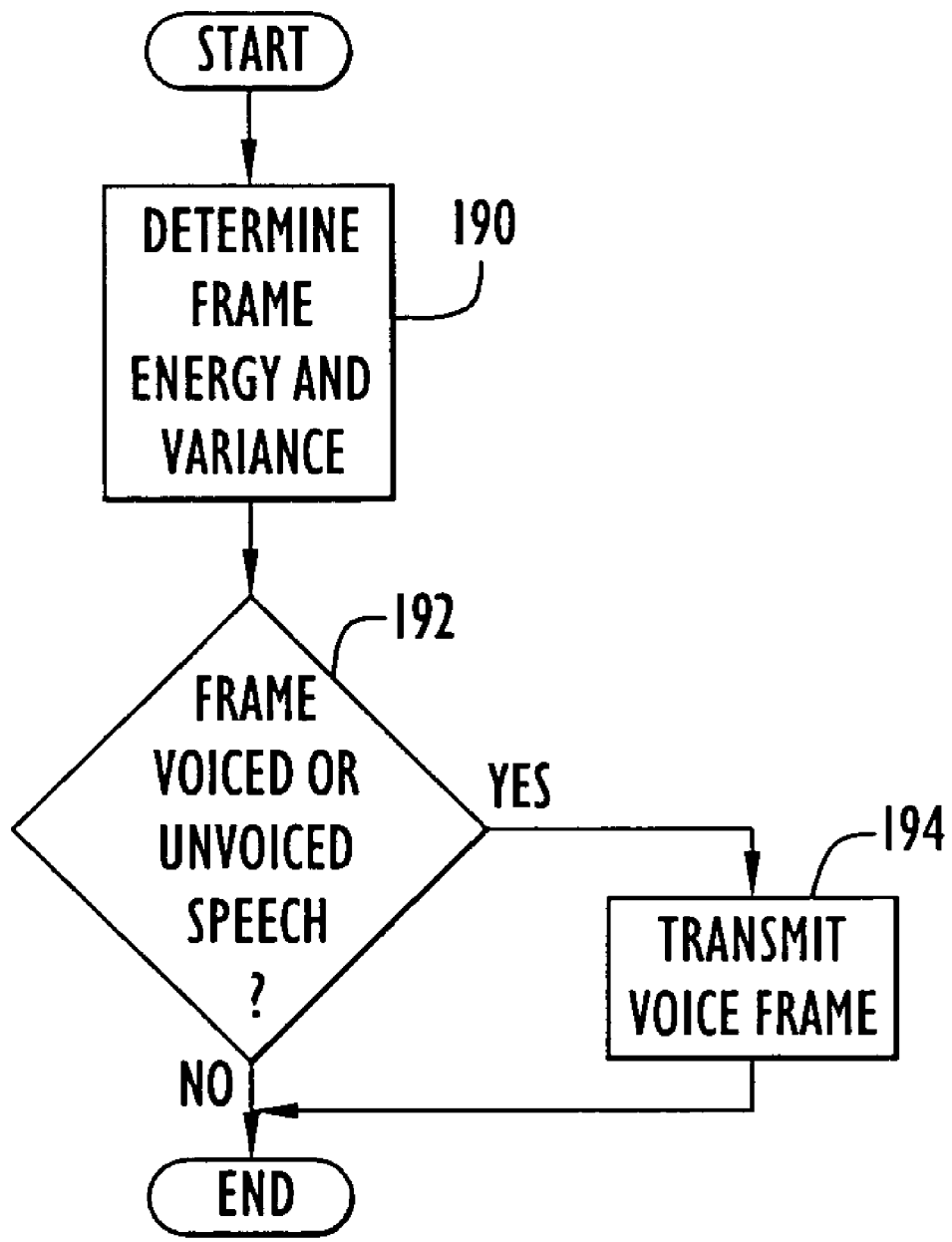
FIG. 9 is an exemplary flow chart illustrating the manner in which a network node conserves bandwidth by removing silence frames from voice transmissions according to the present invention.

The manner in which a node according to the present invention detects and removes silence intervals is illustrated in FIG. 9. Initially, a frame of voice data can be classified as either voice or unvoiced. A voiced frame differs from an unvoiced frame based on the voiced frame having a periodic pitch period. A silence frame is classified as unvoiced. Therefore, a frame detected to have no voicing may be either an unvoiced or silence frame. The transmitting node receives and processes voice signals from a user as described above. A silence frame is detected when an unvoiced frame lasts continuously for more than N frames. The silence detector of the transmitting node tracks the frame energy, Ek, of a silence frame and determines, at step 190, a running average and variance of frame energy as follows:

$$E_k = (1-u)E_{k-1} + uE_f \quad \text{(Equation 2)}$$

$$\sigma_k = (1-u)\sigma_{k-1} + u|E_f - E_k| \quad \text{(Equation 3)}$$

where u is the weighting factor and $E_f$ is the energy of the current frame. If a frame is detected to be unvoiced speech, the frame is not included in the running average and variance.

The node determines whether a frame is voiced or unvoiced speech at step 192. Basically, unvoiced speech is detected if the frame is unvoiced and $|E_f - E_k| > 2\sigma_k$, where $E_f$ is the energy of the current frame as described above, $E_k$ is the running average of the silence frame energy as described above and $\sigma_k$ is the frame energy variance as described above. If a frame is determined to be either voiced or unvoiced speech, the voice data bits or frame are transmitted along the routing path at step 194. For further examples of the operation of silence detectors, reference is made to the aforementioned U.S. patent.

Figure 10:
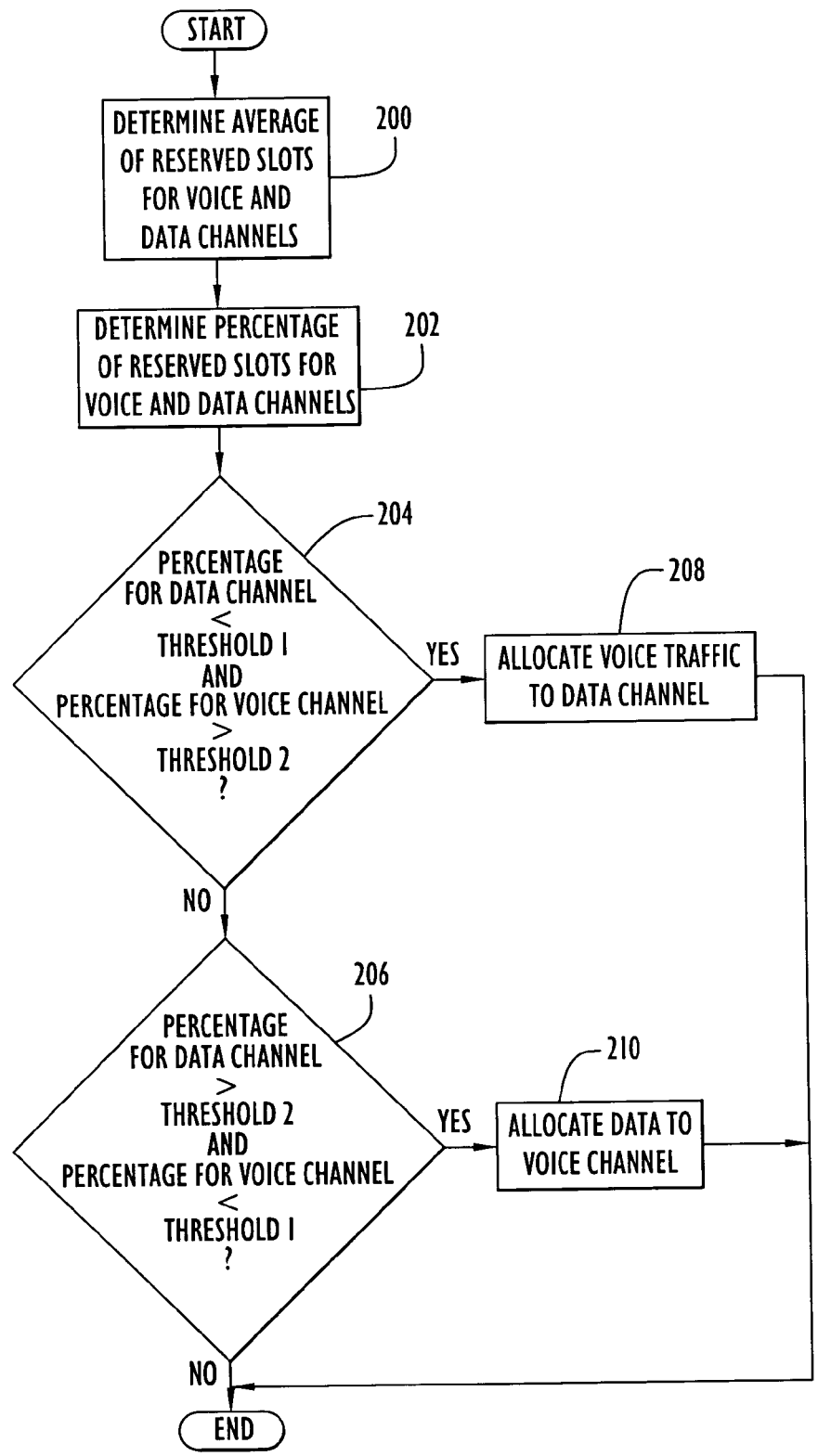
FIG. 10 is an exemplary flow chart illustrating the manner in which a network node allocates transmissions over voice and data channels according to the present invention.

Preferably, voice and data are transmitted on different channels with the reservation being accomplished on the data channel as described above. If both the data and voice channels are heavily utilized, there is no need to allocate voice and data traffic. However, in circumstances where one channel is lightly loaded and the other channel is heavily loaded, the present invention may allocate some of the traffic from the heavily loaded channel to the lightly loaded channel. In other words, both voice and data may occupy the same channel. The manner in which a node according to the present invention performs channel allocation is illustrated in FIG. 10. Specifically, a node determines a running average of reserved slots for the voice and data channels at step 200. Basically, the node monitors the total number of reserved slots in the voice channel and the slot utilizations in the data channel, where the data channel access scheme is not limited to be TDMA. A time running average for each channel is determined as follows:

$$M_k = (1-w)M_{k-1} + w*U_k \quad \text{(Equation 4)}$$

where $M_k$ represents the average of reserved time slots at time k, $U_k$ represents the total number of currently reserved slots and w is a weighting coefficient between 0 and 1. If w is large, M can adapt faster to the most recent reserved number of slots. If w is small, M can not reflect the instantaneous voice traffic variations. The node determines the average each time a new reservation packet needs to be transmitted.

Figure 11:
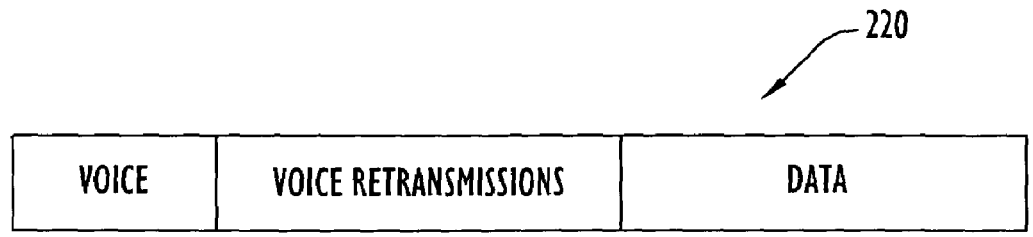
FIG. 11 is a diagrammatic illustration of an exemplary voice channel frame architecture with integrated voice information and data and supporting retransmissions.
Figure 12:
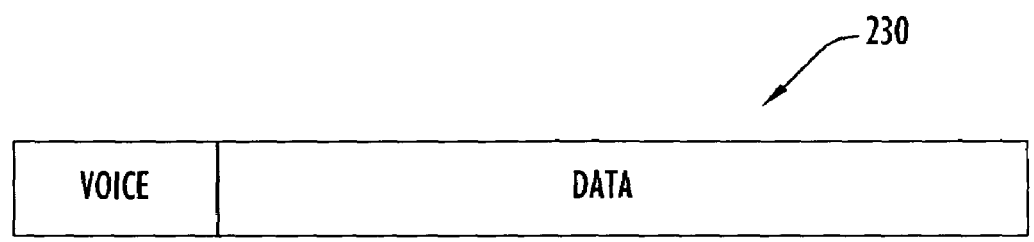
FIG. 12 is a diagrammatic illustration of an exemplary voice channel frame architecture with integrated voice information and data without retransmissions.
Figure 13:
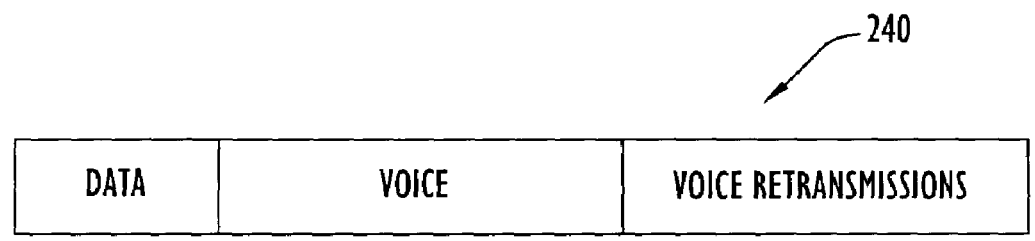
FIG. 13 is a diagrammatic illustration of an exemplary data channel frame architecture with integrated voice information and data and supporting retransmissions.
Figure 14:
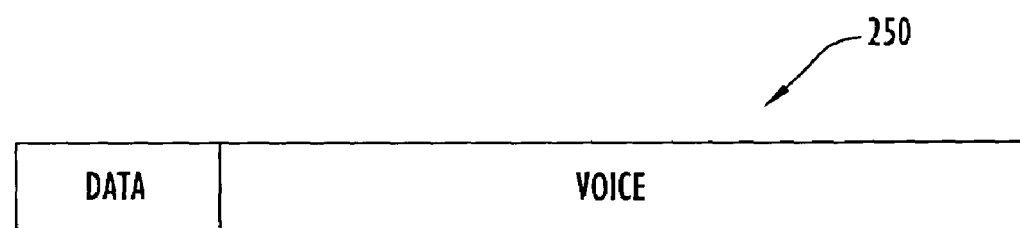
FIG. 14 is a diagrammatic illustration of an exemplary data channel frame architecture with integrated voice information and data without retransmissions.

The node further determines the percentage of reserved slots for the voice and data channels at step 202. The reserved slot percentage (e.g., $M_k^v$ represents the percentage for voice slot reservations and $M_k^d$ represents the percentage for data slot utilization) is determined from the ratio of Mk and the total number of slots in a frame. If the data slot percentage is less than a lower threshold utilization percentage, p1 (e.g., the threshold indicating a light load), and the voice slot percentage is greater than an upper threshold utilization percentage, p2 (e.g., the threshold indicating a heavy load) (e.g., $M_k^d < p1$ and $M_k^v > p2$), as determined at step 204, the node allocates voice traffic to the data channel at step 208 (FIGS. 13–14). If the data slot percentage is greater than the upper threshold utilization percentage, p2, and the voice slot percentage is less than the lower threshold utilization percentage, p1, (e.g., $M_k^d > p2$ and $M_k^v < p1$), as determined at step 206, the node allocates data traffic to the voice channel at step 210 (FIGS. 11–12). By way of example only, the lower threshold utilization percentage, p1, may be set to 30%, while the upper threshold utilization percentage, p2, may be set to 90%. In this case, channel allocation may occur if one channel is loaded less than 30%, while the other channel has greater than 90% utilization. However, the threshold percentages may be set to any suitable values to provide a desired channel allocation by the node.

Exemplary frame architectures integrating voice and data are illustrated in FIGS. 11–14. In particular, FIG. 11 illustrates a frame architecture 220 including integrated voice and data for transmission over the voice channel with support for voice retransmission. A frame architecture 230 including integrated voice and data without voice retransmission for transmission over the voice channel is illustrated in FIG. 12. The data slots preferably start at (p1+δ)N, where p1 is the lower threshold utilization percentage, N is the quantity of slots in a frame and δ is a safety factor to allow sudden voice traffic bursts. If there is a sudden voice traffic increase while the data messages are in the process of transmission, the current data traffic is allowed to finish, but is barred from future use of the voice channel.

FIG. 13 illustrates a frame architecture 240 including integrated voice and data for transmission over the data channel with support for voice retransmissions. A frame architecture 250 including integrated voice and data without voice retransmission for transmission over the data channel is illustrated in FIG. 14. The data channel frame architectures are similar in operation to those described above for the voice channel. The voice slots preferably start at (p1+δ)N, where p1 is the lower threshold utilization percentage, N is the quantity of slots in a frame and δ is a safety factor to allow sudden data traffic bursts. If there is a data voice traffic increase while the voice messages are in the process of transmission, the current voice traffic is allowed to finish, but is barred from future use of the data channel.

It will be appreciated that the embodiments described above and illustrated in the drawings represent only a few of the many ways of implementing a method and apparatus for dynamic voice reservation within wireless networks.

The communication networks employing the present invention nodes may include any quantity of those nodes or tiers. The network nodes may be arranged in any fashion into any quantity of islands each having any quantity of nodes. The backbone network may include any quantity of head nodes, while communications within an island and between neighboring head nodes of the backbone network may utilize the same or different transmission frequencies. The formation of islands and designation of head nodes may be predetermined or accomplished dynamically via any conventional or other algorithm or technique. The nodes may communicate via any suitable communications medium (e.g., wired or wireless communication devices, etc.).

The present invention node may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The present invention node may include any quantity of independent transmitting and/or receiving devices, and utilize any quantity of frequency channels of any desired frequencies to send voice and/or data. The present invention node may employ any conventional access scheme or protocol to access and/or transmit information on the data channel. The present invention node may include any quantity of any conventional or other audio components (e.g., speaker, microphone, etc.) and associated circuitry or devices (e.g., coder, A/D or D/A converter, etc.) to process voice signals. The present invention node may further include any quantity of any types of input or control devices (e.g., buttons, switches, etc.) to enter voice or data and control node operation. The node may be in the form of any type of radio unit or other communications device.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of hardware and/or software modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate reservations and distribution of voice and/or data within the network in the manner described above.

The reservation request, confirmation, database update, neighbor discovery, termination, voice or other packets or messages may be of any size, may have any format, and may contain any desired information. The packets may be transmitted at any suitable transmission rate or have any desired interval between transmissions. The various messages or packets may include any identifier to identify the type of message or packet. The packets may be broadcasted or transmitted any quantity of times.

The frame architectures may be of any quantity and include any quantity of slots. The slots may be reserved or assigned in any manner, where the frame may be arranged in any fashion. The frame may include any quantity of transmission, retransmission, acknowledgement or other slots (e.g., reserved for specific purposes, for a particular application, etc.) arranged in any fashion. The frame may structured to be compatible with any network or transmission scheme (e.g., TDMA, etc.). The various slots (e.g., transmission, retransmission, acknowledgement, etc.) may be transmitted within the same or any quantity of different frequency channels. The frame architecture may be selected in any fashion based on any conditions, predetermined and/or entered by a user in any fashion (e.g., input devices, etc.). The frame architecture may be associated with any symbol or identifier (e.g., number, alphanumeric characters, etc.).

The reservation, termination and other information may be embedded or piggybacked within any suitable packet (e.g., database update, neighbor discovery, etc.). Alternatively, this information may be transmitted in respective packets or messages of any quantity. The node database may be implemented by any conventional database or other storage structure (e.g., processor memory, external memory, file, data structure (e.g., array, queue, stack, etc.), etc.) and may have any desired storage capacity to contain any desired information.

The database update and neighbor discovery packets may be transmitted at any desired intervals and/or in response to any desired events or conditions. The acknowledgments may be implied in any manner indicating reception of a packet by a destination node, or transmission of an acknowledgment from a receiving node may be required by a transmitting node.

Voice information may be received from a user and processed in any conventional or other manner for transmission. Conversely, voice information from another node may be received and processed in any conventional or other manner for conveyance to a user (e.g., via an audio device). Voice may be retransmitted any quantity of times in response to any conditions (e.g., no ACK, etc.).

The present invention node may employ any conventional or other silence detector. The silence detector may be implemented within the node processor or via hardware and/or software modules or circuitry disposed within the node. The node may include any quantity of channels and allocate voice and/or data to those channels in any manner. The threshold utilization percentages may set to any desired values to control allocation of voice and data to the data channels. Voice and data may be integrated into a channel frame in any fashion. The frames may include any quantity of slots (e.g., any quantity for data, voice, retransmassions, etc.) arranged in any fashion. The additional allocated information (e.g., voice for the data channel and data for the voice channel) may start at any desired slot position, where a safety or buffer factor may be utilized and set to any desired quantity of slots.

It is to be understood that the present invention is not limited to the applications or networks described herein, but may be utilized for various communication applications or networks, especially those transmitting voice and/or including wireless Ad Hoc radio networks.

From the foregoing description, it will be appreciated that the invention makes available a novel method and apparatus for dynamic voice reservation within wireless networks, wherein a multi-hop wireless Ad-Hoc network employs voice reservation with dynamic selection of frame architectures depending on voice mode operation (e.g., simplex/duplex) and associated retransmission/acknowledgement mechanisms.

Having described preferred embodiments of a new and improved method and apparatus for dynamic voice reservation within wireless networks, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications network, a communication unit to transmit and receive information within said network comprising:
    at least one transmitter to transmit outgoing information to at least one other communication unit within said network;
    at least one receiver to receive incoming information from at least one other communication unit within said network; and
    a processor to control said transmission and reception of said outgoing and incoming information, wherein said processor includes:
        a reservation module to reserve at least one communication link within said network for communicating with at least one other communication unit and to dynamically select a frame architecture from among a plurality of frame architectures employed by said communication unit based on the mode of said communications and utilization of a retransmission scheme over said reserved communication link, wherein said plurality of frame architectures support full duplex and simplex modes of communications and retransmission of information;
        wherein said selected frame architecture includes a plurality of time slots serving as said communication link, and said plurality of time slots includes for a simplex mode at least one time slot associated with a transmission path, for a duplex mode at least one additional time slot associated with a receiving path, for a retransmission mode at least one additional time slot to said simplex or duplex modes and associated with a retransmission of information, and at least one time slot associated with an acknowledgement.

2. The unit of claim 1, wherein said network is a wireless Ad-Hoc network and said incoming and outgoing information includes voice.

3. The unit of claim 1, wherein said at least one transmitter transmits said outgoing information in the form of radio signals.

4. The unit of claim 1, wherein said at least one receiver receives said incoming information in the form of radio signals.

5. The unit of claim 1, wherein said plurality of frame architectures is compatible with a Time Division Multiple Access (TDMA) scheme.

6. The unit of claim 1, wherein said selected frame architecture is employed along a routing path between said communication unit and said at least one other communication unit, and said reservation module further includes:
- a destination acknowledge module to reserve an acknowledgement time slot for said transmission path to acknowledge receipt of information in response to said unit being a destination unit;
- a source acknowledge module to reserve an acknowledgement time slot for said receiving path to acknowledge receipt of information in response to said unit requesting said reservation; and
- an intermediate acknowledge module to verify, in response to said unit being an intermediate unit within said routing path, receipt of information transmitted from said unit based on detecting transmission of information from a succeeding unit within said routing path.

7. The unit of claim 1, wherein said reservation module includes:
- a neighbor module to facilitate transmission of information relating to said reservation to neighboring communication units in response to reservation of said at least one communication link, wherein said reservation information is disposed within neighbor discovery packets periodically transmitted by said unit.

8. The unit of claim 1, wherein said selected frame architecture includes said plurality of time slots serving as said communication link, and said reservation module includes:
- a reservation request module to facilitate transmission of a reservation packet along a routing path to a destination communication unit, wherein said reservation packet requests reservation of particular time slots for communication with said destination unit.

9. The unit of claim 8, wherein said reservation module further includes:
- a request module to store time slot reservations received within a reservation packet from another communication unit and to process said received time slot reservations in accordance with reservation information within said received reservation packet.

10. The unit of claim 9, wherein said request module includes:
- a slot module to determine, in response to said unit being an intermediate unit within said routing path, available time slots for transmission and retransmission of information in accordance with said reservation information, wherein said reservation information includes information relating to a selected frame architecture and time slots utilized by previous units within said routing path;
- a configuration module to determine, in response to said unit being an intermediate unit within said routing path, a frame architecture supported by said unit when said selected frame architecture is incompatible with said unit;
- a slot availability module to adjust, in response to said unit being an intermediate unit within said routing path, a quantity of empty slots within said reservation packet when said empty slot quantity is greater than a quantity of empty slots associated with said unit; and
- a transmission module to transmit, in response to said unit being an intermediate unit within said routing path, said reservation packet to a succeeding unit within said routing path.

11. The unit of claim 9, wherein said request module includes:
- a frame module to determine, in response to said unit being a destination unit, a frame architecture supported by each unit within said routing path;
- a slot reservation module to reserve, in response to said unit being a destination unit, said time slots requested for reservation; and
- a reservation transmission module to transmit, in response to said unit being a destination unit, a confirmation packet including reservation information to said unit requesting a reservation and reservation information to neighboring units.

12. The unit of claim 8, wherein said reservation module further includes:
- a reservation confirmation module to process a confirmation packet received in response to confirmation of a reservation, wherein said confirmation packet includes information relating to reserved time slots and said selected frame architecture and is transmitted to a unit requesting the particular reservation.

13. The unit of claim 12, wherein said reservation confirmation module includes:
- a configuration update module to update, in response to said unit being at least one of an intermediate routing path unit and said requesting unit, a frame architecture in accordance with said frame architecture within said confirmation packet;
- a slot update module to update, in response to said unit being at least one of an intermediate routing path unit and said requesting unit, said reserved time slots in accordance with said updated frame architecture;
- a slot selection module to select, in response to said unit being at least one of an intermediate routing path unit and said requesting unit, time slots to facilitate communication in a return path;
- an acknowledgement reservation module to reserve an acknowledgement slot in response to said unit being said requesting unit and said updated frame architecture supporting retransmission; and
- a confirmation transmission module to transmit, in response to said unit being at least one of an intermediate routing path unit and said requesting unit, confirmation information to neighboring units, wherein said confirmation information includes said updated frame architecture and time slots.

14. The unit of claim 1, wherein said processor further includes:
- a voice transmission module to process voice signals received by said unit and facilitate transmission of said processed voice signals over said reserved communication link.

15. The unit of claim 14, wherein said voice transmission module includes:
- a silence detection module to detect silence frames within said received voice signals and prevent transmission of said detected silence frames.

16. The unit of claim 14, wherein said processor further includes:
    a retransmission module to facilitate retransmission of voice information in response to absence of an acknowledgement of said transmitted voice signals.

17. The unit of claim 16, wherein said voice transmission module facilitates transmission of said processed voice signals on a first frequency channel, and said retransmission module facilitates retransmission of said processed voice signals on a second different frequency channel.

18. The unit of claim 17, wherein said selected frame architecture includes transmission slots within a first half of said frame and retransmission slots within a second half of said frame.

19. The unit of claim 14, wherein said processor further includes:
    a voice reception module to receive voice information from said network and process said received voice signals for conveyance to a user.

20. The unit of claim 14, wherein said processor further includes:
    a termination module to terminate communications over said at least one reserved communication link and to remove said reservation of said at least one communication link.

21. In a communications network, a communication unit to transmit and receive information within said network comprising:
    at least one transmitter to transmit outgoing information to at least one other communication unit within said network;
    at least one receiver to receive incoming information from at least one other communication unit within said network; and
    a processor to control said transmission and reception of said outgoing and incoming information, wherein a data channel facilitates reservation of a communication link and a voice channel facilitates transfer of voice information, and said processor includes:
        a reservation module to reserve at least one communication link within said network for communicating with at least one other communication unit and to dynamically select a frame architecture to facilitate said communications over said reserved communication link;
        a data allocation module to allocate data to said voice channel in response to utilization of said voice channel being below a first utilization threshold and utilization of said data channel being greater than a second utilization threshold; and
        a voice allocation module to allocate voice information to said data channel in response to utilization of said data channel being below said first utilization threshold and utilization of said voice channel being greater than said second utilization threshold;
    wherein said first utilization threshold indicates light utilization and said second utilization threshold indicates heavy utilization.

22. In a communication unit of a network, a method of transferring information with other communication units within said network comprising:
    (a) reserving at least one communication link within said network for communications with at least one other communication unit and dynamically selecting a frame architecture from among a plurality of frame architectures employed by said communication unit based on the mode of said communications and utilization of a retransmission scheme over said reserved communication link, wherein said plurality of frame architectures support full duplex and simplex modes of communications and retransmission of information;
    wherein said selected frame architecture includes a plurality of time slots serving as said communication link, and said plurality of time slots includes for a simplex mode at least one time slot associated with a transmission path, for a duplex mode at least one additional time slot associated with a receiving path, for a retransmission mode at least one additional time slot to said simplex or duplex modes and associated with a retransmission of information, and at least one time slot associated with an acknowledgement.

23. The method of claim 22, wherein said network is a wireless Ad-Hoc network and said information includes voice.

24. The method of claim 22, wherein said plurality of frame architectures is compatible with a Time Division Multiple Access (TDMA) scheme.

25. The method of claim 22, wherein said selected frame architecture is employed along a routing path between said communication unit and said at least one other communication unit, and step (a) further includes:
    (a.1) reserving an acknowledgement time slot for said transmission path to acknowledge receipt of information in response to said unit being a destination unit;
    (a.2) reserving an acknowledgement time slot for said receiving path to acknowledge receipt of information in response to said unit requesting said reservation; and
    (a.3) verifying, in response to said unit being an intermediate unit within said routing path, receipt of information transmitted from said unit based on detecting transmission of information from a succeeding unit within said routing path.

26. The method of claim 22, wherein step (a) further includes:
    (a.1) transmitting information relating to said reservation to neighboring communication units in response to reservation of said at least one communication link, wherein said reservation information is disposed within neighbor discovery packets periodically transmitted by said communication unit.

27. The method of claim 22, wherein said selected frame architecture includes said plurality of time slots serving as said communication link, and step (a) further includes:
    (a.1) transmitting a reservation packet along a routing path to a destination communication unit, wherein said reservation packet requests reservation of particular time slots for communication with said destination unit.

28. The method of claim 27, wherein step (a) further includes:
    (a.2) storing time slot reservations received within a reservation packet from another communication unit and processing said received time slot reservations in accordance with reservation information within said received reservation packet.

29. The method of claim 28, wherein step (a.2) further includes:
    (a.2.1) determining, in response to said unit being an intermediate unit within said routing path, available time slots for transmission and retransmission of information in accordance with said reservation information, wherein said reservation information includes information relating to a selected frame architecture and time slots utilized by previous units within said routing path;

(a.2.2) determining, in response to said unit being an intermediate unit within said routing path, a frame architecture supported by said unit when said selected frame architecture is incompatible with said unit;

(a.2.3) adjusting, in response to said unit being an intermediate unit within said routing path, a quantity of empty slots within said reservation packet when said empty slot quantity is greater than a quantity of empty slots associated with said unit; and (a.2.4) transmitting, in response to said unit being an intermediate unit within said routing path, said reservation packet to a succeeding unit within said routing path.

30. The method of claim 28, wherein step (a.2) further includes:

(a.2.1) determining, in response to said unit being a destination unit, a frame architecture supported by each unit within said routing path;

(a.2.2) reserving, in response to said unit being a destination unit, said time slots requested for reservation; and (a.2.3) transmitting, in response to said unit being a destination unit, a confirmation packet including reservation information to said unit requesting a reservation and reservation information to neighboring units.

31. The method of claim 27, wherein step (a) further includes:

(a.2) processing a confirmation packet received in response to confirmation of a reservation, wherein said confirmation packet includes information relating to reserved time slots and said selected frame architecture and is transmitted to a unit requesting the particular reservation.

32. The method of claim 31, wherein step (a.2) further includes:

(a.2.1) updating, in response to said unit being at least one of an intermediate routing path unit and said requesting unit, a frame architecture in accordance with said frame architecture within said confirmation packet;

(a.2.2) updating, in response to said unit being at least one of an intermediate routing path unit and said requesting unit, said reserved time slots in accordance with said updated frame architecture;

(a.2.3) selecting, in response to said unit being at least one of an intermediate routing path unit and said requesting unit, time slots to facilitate communication in a return path;

(a.2.4) reserving an acknowledgement slot in response to said unit being said requesting unit and said updated frame architecture supporting retransmission; and (a.2.5) transmitting, in response to said unit being at least one of an intermediate routing path unit and said requesting unit, confirmation information to neighboring units, wherein said confirmation information includes said updated frame architecture and time slots.

33. The method of claim 22 further including:

(b) processing voice signals received by said unit and transmitting said processed voice signals over said reserved communication link.

34. The method of claim 33, wherein step (b) further includes:

(b.1) detecting silence frames within said received voice signals and preventing transmission of said detected silence frames.

35. The method of claim 33, further including:

(c) retransmitting voice information in response to absence of an acknowledgement of said transmitted voice signals.

36. The method of claim 35, wherein step (b) further includes:

(b.1) transmitting said processed voice signals on a first frequency channel; and step (c) further includes:

(c.1) retransmitting said processed voice signals on a second different frequency channel.

37. The method of claim 36, wherein said selected frame architecture includes transmission slots within a first half of said frame and retransmission slots within a second half of said frame.

38. The method of claim 33 further including:

(c) receiving voice information from said network and processing said received voice signals for conveyance to a user.

39. The method of claim 33 further including:

(c) terminating communications over said at least one reserved communication link and removing said reservation of said at least one communication link.

40. In a communication unit of a network, wherein said unit includes a data channel to facilitate reservation of a communication link and a voice channel to facilitate transfer of voice information, a method of transferring information with other communication units within said network comprising:

(a) reserving at least one communication link within said network for communications with at least one other communication unit and dynamically selecting a frame architecture to facilitate said communications over said reserved communication link, wherein step (a) further includes:

(a.1) allocating data to said voice channel in response to utilization of said voice channel being below a first utilization threshold and utilization of said data channel being greater than a second utilization threshold; and (a.2) allocating voice information to said data channel in response to utilization of said data channel being below said first utilization threshold and utilization of said voice channel being greater than said second utilization threshold;

wherein said first utilization threshold indicates light utilization and said second utilization threshold indicates heavy utilization.

41. A communications network comprising:

a plurality of communication units for transferring information therebetween, wherein at least one communication link within said network is reserved by a communication unit for communicating with at least one other communication unit and said communicating units dynamically select a frame architecture from among a plurality of frame architectures employed by said communicating units based on the mode of said communications and utilization of a retransmission scheme over said reserved communication link, wherein said plurality of frame architectures support full duplex and simplex modes of communications and retransmission of information;

wherein said selected frame architecture includes a plurality of time slots serving as said communication link, and said plurality of time slots includes for a simplex mode at least one time slot associated with a transmission path, for a duplex mode at least one additional time slot associated with a receiving path, for a retransmission mode at least one additional time slot to said simplex or duplex modes and associated with a retransmission of information, and at least one time slot associated with an acknowledgement.

42. The network of claim 41, wherein said network is a wireless Ad-Hoc network and said information includes voice.

43. In a communications network, a method of transferring information between communication units within said network comprising:
(a) reserving at least one communication link within said network for communications between at least two communication units, wherein said communicating units dynamically select a frame architecture from among a plurality of frame architectures employed by said communicating units based on the mode of said communications and utilization of a retransmission scheme over said reserved communication link, wherein said plurality of frame architectures support full duplex and simplex modes of communications and retransmission of information;
wherein said selected frame architecture includes a plurality of time slots serving as said communication link, and said plurality of time slots includes for a simplex mode at least one time slot associated with a transmission path, for a duplex mode at least one additional time slot associated with a receiving path, for a retransmission mode at least one additional time slot to said simplex or duplex modes and associated with a retransmission of information and at least one time slot associated with an acknowledgement.

44. The method of claim 43, wherein said network is a wireless Ad-Hoc network and said information includes voice.

* * * * *